(12) United States Patent
Golzi et al.

(10) Patent No.: US 10,991,235 B2
(45) Date of Patent: Apr. 27, 2021

(54) FIRE-PREVENTION CONTROL UNIT

(71) Applicant: SANCO S.P.A., Galliate (IT)

(72) Inventors: Paolo Golzi, Galliate (IT); Alessandro Parozzi, Galliate (IT); Stefano Ruspa, Galliate (IT)

(73) Assignee: SANCO S.P.A., Galliate (IT)

( * ) Notice: Subject to any disclaimer, the term of this patent is extended or adjusted under 35 U.S.C. 154(b) by 0 days.

(21) Appl. No.: 16/469,730

(22) PCT Filed: Dec. 15, 2017

(86) PCT No.: PCT/IB2017/058005
§ 371 (c)(1),
(2) Date: Jun. 14, 2019

(87) PCT Pub. No.: WO2018/109739
PCT Pub. Date: Jun. 21, 2018

(65) Prior Publication Data
US 2019/0362620 A1 Nov. 28, 2019

(30) Foreign Application Priority Data
Dec. 16, 2016 (IT) .................. 102016000127390

(51) Int. Cl.
*G08B 29/16* (2006.01)
*H04L 12/40* (2006.01)

(52) U.S. Cl.
CPC ............. *G08B 29/16* (2013.01); *H04L 12/40* (2013.01)

(58) Field of Classification Search
CPC ............................... G08B 29/16; H04L 12/40
See application file for complete search history.

(56) References Cited

U.S. PATENT DOCUMENTS 7,032,135 B2 * 4/2006 Harel ................. G06F 11/2005
370/425
7,609,159 B2 * 10/2009 Benson ................. G06Q 10/08
340/540

(Continued)

FOREIGN PATENT DOCUMENTS

| EP | 2423897 A2 | 2/2012 |
| EP | 2595018 A2 | 5/2013 |
| WO | 2006119323 A2 | 11/2006 |

OTHER PUBLICATIONS

International Search Report, dated May 4, 2018, from corresponding PCT/IB2017/058005 application.

(Continued)

*Primary Examiner* — Hoi C Lau
(74) *Attorney, Agent, or Firm* — Nixon & Vanderhye

(57) ABSTRACT

Fire-prevention control unit including several circuit boards and a dedicated communication bus for communication between the circuit boards, the circuit boards including at least one processing board, at least one input board and at least one output board. The at least one processing board is intended to process input data received from the at least one input board and to generate commands to send to the at least one output board, the at least one input board and the at least one output board being intended to communicate with one or more devices to be monitored or controlled. Each circuit board has two identical and physically distinct functional logic units, the functional logic units being adapted to perform the same function, each functional logic unit having a unit for direct communication with the communication bus according to a configurable architecture.

20 Claims, 7 Drawing Sheets

(56) References Cited

U.S. PATENT DOCUMENTS

| | | | |
|---|---|---|---|
| 7,656,286 B2* | 2/2010 | Benson | G07G 1/0036 340/508 |
| 8,830,053 B2* | 9/2014 | Benson | G06F 21/52 340/506 |
| 2002/0180598 A1* | 12/2002 | Pfefferseder | G08B 25/085 340/500 |
| 2003/0156043 A1* | 8/2003 | Doescher | B61C 17/04 340/901 |
| 2004/0032338 A1* | 2/2004 | Hooks | G06F 3/147 340/815.45 |
| 2004/0078620 A1* | 4/2004 | Harel | H04Q 1/028 714/4.11 |
| 2006/0291657 A1* | 12/2006 | Benson | G08B 13/196 380/270 |
| 2008/0228968 A1* | 9/2008 | Aihara | G06F 9/4411 710/66 |
| 2010/0090822 A1* | 4/2010 | Benson | G08B 13/22 340/508 |
| 2012/0126623 A1* | 5/2012 | Koehl | H02J 3/381 307/76 |
| 2013/0120135 A1* | 5/2013 | Benson | G06F 11/202 340/506 |
| 2013/0131832 A1 | 5/2013 | Beagher et al. | |
| 2013/0282946 A1* | 10/2013 | Ricci | G06F 13/4027 710/306 |
| 2018/0025653 A1* | 1/2018 | Wang | G08G 5/0008 340/961 |
| 2018/0335824 A1* | 11/2018 | MacNamara | H04L 41/0893 |
| 2019/0042339 A1* | 2/2019 | Doshi | G06F 9/45558 |
| 2019/0042388 A1* | 2/2019 | Wang | G06F 13/4282 |
| 2019/0042518 A1* | 2/2019 | Marolia | G06F 9/45558 |
| 2019/0108111 A1* | 4/2019 | Levin | H04L 1/1835 |
| 2019/0182161 A1* | 6/2019 | Ravi | H04L 47/11 |
| 2020/0007547 A1* | 1/2020 | Valiquette | H04L 63/20 |
| 2020/0183761 A1* | 6/2020 | Roy | G06F 9/541 |

OTHER PUBLICATIONS

Written Opinion, dated May 4, 2018, from corresponding PCT/IB2017/058005 application.

* cited by examiner

FIRE-PREVENTION CONTROL UNIT

BACKGROUND OF THE INVENTION

Field of the Invention

The present invention relates to a fire-prevention control unit comprising several circuit boards and a dedicated communication bus for communication between the circuit boards.

Description of the Related Art

In particular, the circuit boards comprise at least one processing board, at least one input board and at least one output board, so that the processing board is intended to process input data received from the input board according to a programmable computational array and to generate commands to send to the output board.

Moreover, the input board and the output board are intended to communicate with one or more devices to be monitored and/or controlled.

The above description is the common configuration of fire-prevention control units known in the state of the art.

These control units are intended to identify and report a malfunction of one or more devices, monitored by the same control unit, for example caused by an outbreak of fire or by a gas leak.

Therefore, these control units generally have sensors that monitor the operation of one or more devices, said sensors communicating with one or more input boards that transmit data to a processing board.

The processing board processes the data so as to assess whether there is a malfunction of the devices monitored and generate command signals that it transmits to the output boards, which in turn can command block of the devices monitored and/or generation of acoustic and/or warning light alarms.

The possibility of modifying the number of boards gives fire-prevention control units known in the state of the art high adaptability based on operating needs.

Therefore, they can be installed both in environments of limited size and in complex industrial systems, simply by varying the number of circuit boards that monitor and command the various devices.

An example of this architecture is discussed in the document EP2423897, which describes a fire-prevention control unit as described above, which has an architecture commonly used in control units known in the state of the art and nonetheless has various drawbacks and problems, which will be described below, in particular a physical and numerical restriction of use of the resources, such as circuit boards.

In fact, as is apparent, safety and operating efficiency are crucial aspects of these control units.

In particular, operating efficiency is not limited to correct operation of each single circuit board, but also to effective, correct and safe detection and identification of any malfunctions of the devices monitored.

Control units known in the state of the art meet the required safety requirements by increasing the number of circuit boards, so as always to have a "hot standby" adapted to ensure correct operation of the system.

The logic and functional architectures of control units known in the state of the art, besides providing the aforesaid "hot standby", also have complex organizations and a high number of processing boards, so as to ensure correct processability of the data received from the input boards and transmitted to the output boards.

However, an excessive increase in the number of boards, besides increasing the costs of the system, implies both an increase in the possibility of malfunctions of the system due to a fault of one of the boards and problems of wiring and maintenance of the same boards.

Therefore, it is apparent that this solution has both functional and economic drawbacks.

Therefore, there exists a need that is not met by fire-prevention control units known in the state of the art to provide an efficient fire-prevention system that reduces hardware resources to a minimum, optimizing the correct identification of outbreaks of fire inside the environments in which these systems are installed.

BRIEF SUMMARY OF THE INVENTION

The present invention achieves the aforesaid objects by producing a fire-prevention control unit as described above, in which each circuit board has two identical and physically distinct functional logic units, said functional logic units being intended to perform the same function.

Moreover, each functional logic unit has means for direct communication with the communication bus.

A substantially mirrored dual board, whose two functional units can perform the same operation according to different operating modes, is thus physically produced.

According to this configuration, a control unit is thus obtained in which each circuit board has a native redundancy.

In particular, this redundancy is obtained without increasing the number of boards and maintaining high intrinsic safety.

For example, in the case of malfunction of one functional logic unit, corresponding to one half of the circuit board, the control unit can use the other functional logic unit positioned on the mirrored half of the board, without altering the functionality of the control unit.

This makes it possible to obtain a real and native redundancy operating logic, which drastically reduces the possibility of a board being out of use due to a hardware fault.

What is obtained is not simple doubling of the functional logic units inside the same board, but also a native redundancy on each single board, which can be exploited to obtain different operating modes from functional back-up to voting.

This configuration makes it possible both to reduce the number of boards required to command the fire-prevention system, and to maximize functional safety, preventing possible faults due to a part of the apparatus being out of use by exploiting the aforesaid techniques.

As explained in more detail below, besides native redundancy, the control unit operates in non-blocking mode, i.e., in the case of a fault or temporary malfunction of a functional logic unit, operation of the other functional logic unit belonging to the same board is neither altered nor compromised.

The aforesaid configuration also makes it possible to increase the useful life of the single circuit boards as the two logic functional units can be operated alternately.

According to a possible embodiment of the present invention, the communication bus consists of at least two communication channels where each channel is configured for communication between the circuit boards.

Naturally, the double communication channel operates synergically with the configuration of the circuit boards described above.

In this way, a fire-prevention control unit is produced that ensures correct and effective operation regardless of the amount of data exchanged by the circuit boards.

In fact, the circuit boards can be programmed so as to choose which of the two communication channels to use as a function of the data traffic present on a channel or as a function of whether one of the communication channels is available.

In order to better manage the traffic of data traveling on a communication bus, advantageously, said communication bus is preferably configured to manage the priorities of the data communicated by the boards.

This results in a high configurability of the system; the availability of redundant elements (functional units and communication bus) in fact makes it possible to obtain a particular use and operation of the architecture of the system of multinodal and densely connected type.

In particular, a dual physical communication channel is exploited between the subsystems, so as to implement a specific protocol that makes it possible to meet the typical requirements of a safety or fire-prevention system.

Specifically, as will be evident from the description below, dynamic functional clusters are implemented, so as to obtain reorganization of the resources in real time also between several interconnected control units promoting the "availability" of the system and ensuring its operation even in the case of possible faults.

According to a preferred embodiment, each functional logic unit comprises a programmable integrated circuit of FPGA (Field Programmable Gate Array) type.

Due to this configuration, the control unit of the present invention, and in particular the processing board, does not require implementation of a dedicated functional software, as instead occurs in known control units, making the whole system more stable.

In fact, the absence of this software ensures the operating continuity of the control unit, as the FPGA hardware is programmed before set-up of the control unit and is configured as finite physical device, comparable to a circuit diagram, which does not require further implementations during operability of the same control unit.

In fact, the presence of a unit like the FPGA completely programmable in advance, reduces the possibility of undesirable or uncontrollable behaviours normally introduced by the implementation of software and due to the degree of testability and operational predictability.

Moreover, the FPGA becomes synergic with the architecture of the control unit described above, as a series of functional modes, ranging from simple redundancy to configurations that use arbitration and voting procedures, can be provided.

Finally, the presence of the FPGA allows the various logic resources to be reconfigured in real time.

According to a possible embodiment, each circuit board comprises at least one logic gate configured so that each functional logic unit operates in diagnostic and non-blocking mode on the resource, with respect to the other functional logic unit.

For example, the circuit boards communicate on the communication bus and on the various physical devices through an XOR gate that, exploiting logic reading, always allows suitable control of the resources by the dual logic.

Through implementation of the aforesaid non-blocking operating mode in combination with the architecture described above, one of the main problems of prior art control units is solved.

In fact, in known control units, in the case in which two boards or two logic units command the same device and one of the two has a malfunction, the resource could be maintained occupied by the non-functioning board, preventing the other functioning board from taking over and controlling the device correctly.

According to a possible embodiment, it is possible for at least one user interface unit to be connected to the communication bus.

Said user interface unit preferably comprises a processing unit configured to process data sent on the communication bus. The user interface unit thus allows a user to operate on the control unit without utilizing computational resources of the main processing board, for example to detect or recognize the status of the monitored devices and of the system, to execute installation or maintenance operations and to modify logics or settings for which these operations are required by fire-prevention regulations.

In this way, the information present on the communication bus will be processed by the user interface unit, without requiring the intervention of the processing board.

According to a further variant of embodiment, the input and output boards comprise means for generating a control code calculated on the basis of an input or output vector and a board configuration vector of the same board.

Advantageously, said control code is accessible by the processing board or boards for a coherence comparison on the subsystem with a corresponding expected control code.

As will be widely described below, this configuration allows particularly effective system diagnostics to be produced, in which the processing board immediately detects any malfunctions from the coherence of the subsystems up to the specific device. These events are encountered on the basis of the congruity of the control codes generated by the input and output boards.

Moreover, according to a further variant of embodiment, the circuit boards comprise a control unit inter-connection board, which places at least one input board or at least one output board in communication with a processing unit or a remote computational group.

This control unit inter-connection board thus takes care of the transmission and/or reception between subsystems formed by groups of input and output boards, or more probably local field devices, and a remote processing unit.

This variant further increases the safety of the control unit of the present invention.

In fact, in the case of malfunction of the processing board, the computational burden can be satisfied by a remote processing unit, which receives the data circulating on the communication bus due to the presence of the reception and/or transmission board.

In fact, this board is configured to communicate with the remote processing unit transmitting the data detected by the input boards and receiving the processed results to send to the output boards for control of the devices (interconnection bridge).

As is apparent, the peculiarity of the fire-prevention control unit of the present invention lies in the architecture of the various components of the communication bus and how the aforesaid operate synergically to increase the safety, reliability and availability of the control unit.

The aforesaid architecture of the circuit boards, in combination with the communication bus, allows the implementation of dynamic functional clusters, or of subsystems, through real time management of the resources of several interconnected control units. This increases the usability of the system and ensures its operation also in the case of possible faults.

Moreover, due to its architecture, to the configurability, to the possibility of expansion and the availability of communication interfaces, the control unit of the present invention can advantageously be utilized in any context, such as small buildings with limited number of devices to control or large industrial systems with several tens of the aforesaid devices.

From the description above, it is evident how the control unit forming the subject matter of the present invention does not have a simple native redundancy of the functional logic units, but, thanks to the previously described characteristics, above all allows a high configurability and adaptability of the system to be obtained.

Moreover, the work load of the main processing unit, or of the main processing units, is reduced as it is possible to shift the computational logic capacity toward "periphery" of the system, i.e., onto the input/output boards which usually perform tasks under the charge of the main processing unit in common architectures known in the state of the art.

This last aspect, in combination with the production of clusters, i.e., functional subsystems, allows correct operation of the various subsystems and detection of the events associated therewith to be maintained, even in the case of malfunction of the main processing unit or units.

A control unit is thus obtained in which each board incorporates the control logic unit of the architecture, and therefore the operating mode of the logic resources, and can be modified dynamically to reach an operating flexibility that overcomes the physical restriction of the number of boards effectively used.

Finally, the architecture of the control unit of the present invention allows the functional logic units, and also external units, to exploit the information and the data circulating on the communication buses. This results in the implementation of a physical layer used in communication that allows the status of the existing functional subsystem to be recognized, i.e.:

the configuration of the board;
the diagnostic status on the single logic parts;
the physical status of the input and output channels;
an event control time vector.

As will be apparent from the description of some examples of embodiment illustrated, the architecture of the control unit is not limited to the variants described herein, but can also refer to more complex systems with a plurality of circuit boards divided between processing boards and input and output boards according to different interconnection diagrams.

For this reason, the present invention also relates to a fire-prevention system comprising at least one main fire-prevention control unit and at least one user interface unit.

Advantageously, the main fire-prevention control unit has one or more of the characteristics described previously.

Naturally, the fire-prevention system has all the advantages described previously.

Advantageously, the user unit comprises at least one processing unit adapted for communication of the user unit with the communication bus, and at least one display unit.

The present invention also relates to a fire-prevention system comprising at least one main fire-prevention control unit and at least one user interface unit.

In accordance with this configuration, the main control unit comprises at least one processing board, at least one input board and at least one output board, which communicate with one another through the communication bus.

The user interface unit comprises a processing unit that communicates with the communication bus and that processes the data present on this bus.

In this way, the user interface unit has access to the communication bus and, therefore, to the same data also accessed by the processing board or boards. Therefore, the interface unit does not interrogate the aforesaid processing boards to learn the status of the system or of the various devices, thus avoiding overloading of the processing unit.

This configuration controls reporting and the commands remotely. In fact, the user interface unit can collect the data exchanged on the communication bus between the processing board and the input and output boards without influencing their operating status.

Also in this case, the system described above has all the characteristics described previously, in relation both to the communication bus and to the fire-prevention control unit.

Advantageously, the user interface unit can comprise automatic recognition means of at least one user or a group of users.

For example, RFID tags that automatically recognize a user and the credentials of this user can be provided. These recognition means can also configure the interface unit so as to display only the operations that specific users can carry out on the basis of their credentials.

According to a further embodiment of the fire-prevention system of the present invention, it is possible to provide a secondary fire-prevention control unit, in connection with the main fire-prevention control unit, said secondary control unit having at least one input circuit board and at least one output circuit board.

This last variant gives the system of the present invention high adaptability to different construction needs, so as to be able to increase, also progressively, the number of devices to be monitored, i.e., to extend the area of intervention of the control unit.

This characteristic is not limited to representing the application in a possible extended development of the control unit of the present invention, but allows the use of free computational resources physically located elsewhere and which can be exploited locally.

For example, on request, the board or the free processing unit of a connected and remote panel can take charge of the performance of functions of a local panel.

In this way a virtualization and a mirroring of the logic and computational resources between several interconnected control units or panels is obtained.

BRIEF DESCRIPTION OF THE DRAWINGS

These and other characteristics and advantages of the present invention will be more apparent from the description below with reference to some non-limiting examples of embodiments illustrated in the accompanying drawings, wherein.

DETAILED DESCRIPTION OF THE PREFERRED EMBODIMENTS

The fire-prevention system according to the present invention provides a completely configurable control unit intended for installation in any environment to be monitored, for example industrial or commercial, so as to produce an integrated system for monitoring, detection and extinguishing a fire.

Figure 3:
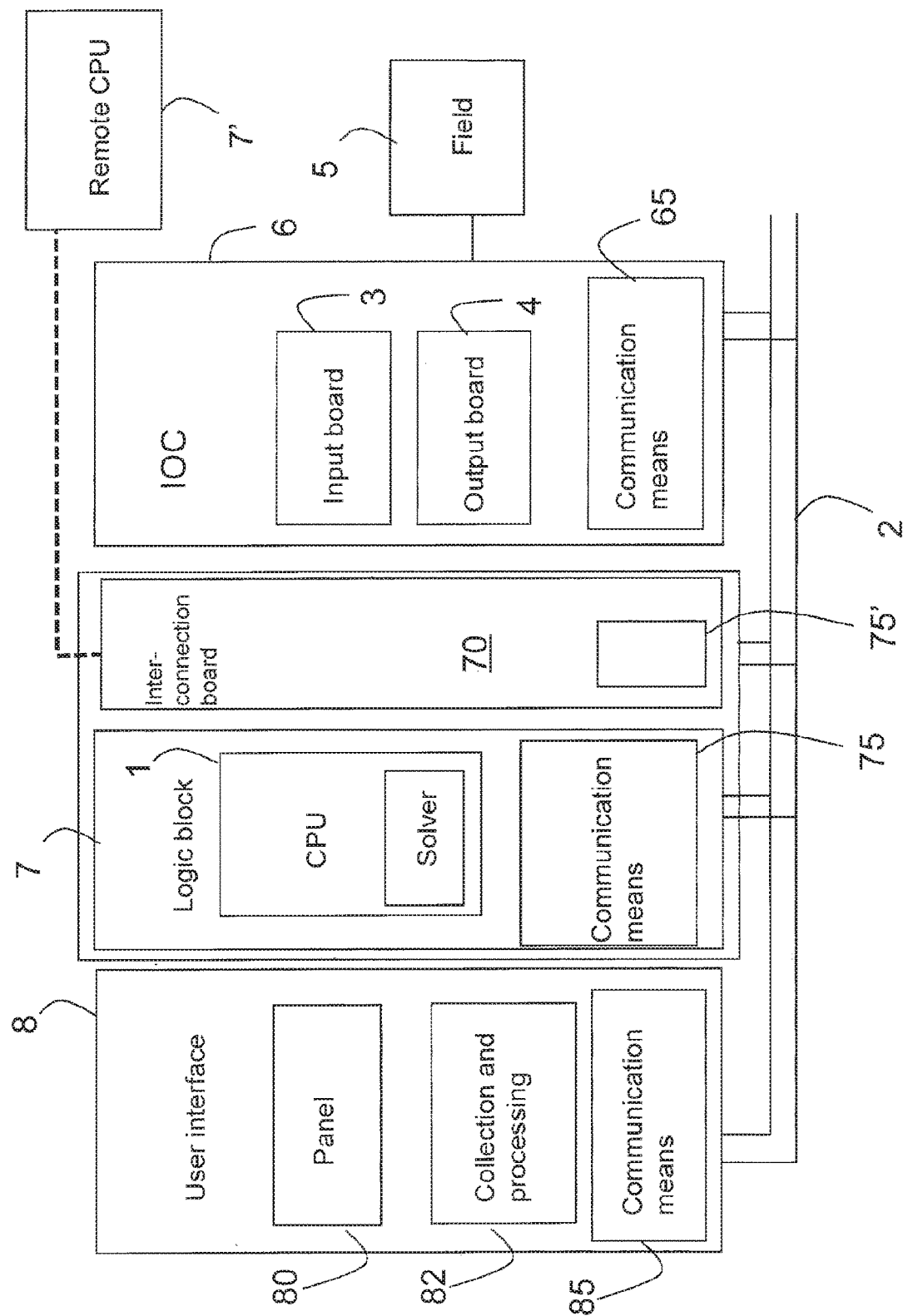
FIG. 3 illustrates a summarizing block diagram of the fire-prevention system.

As illustrated schematically in FIG. 3, the control unit comprises a plurality of circuit boards and a communication bus 2 for communication between said circuit boards, including at least one processing board 1, input boards 3 and output boards 4.

The processing board 1 is intended to process data received from the input boards and to generate commands to send to the output boards. The input 3 and output 4 boards communicate with one or more devices to be monitored or controlled, generically defined "field" 5.

Each circuit board has two substantially identical and physically distinct functional logic units, said functional logic units being intended to perform the same function.

Figure 1:
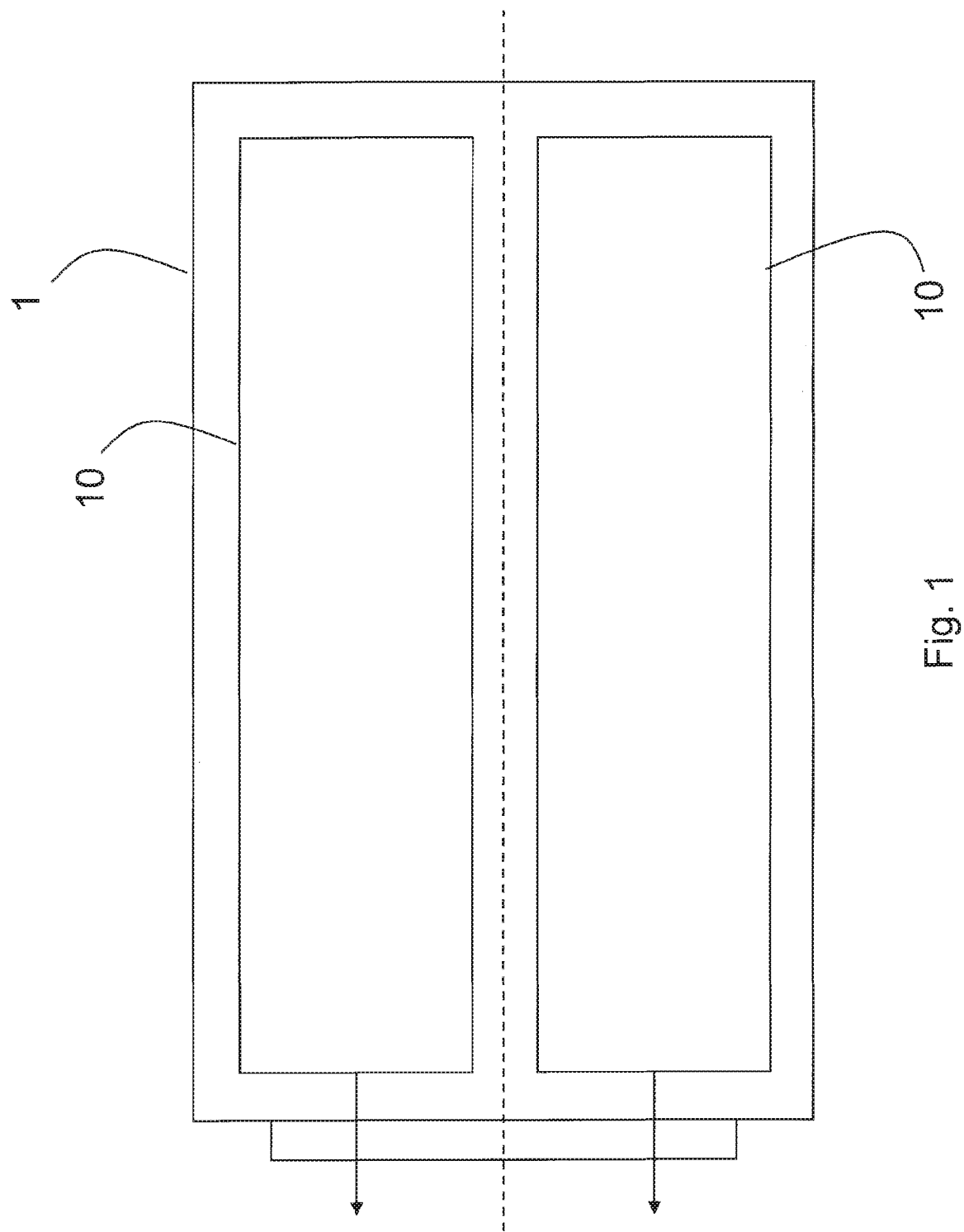
FIG. 1 illustrates the topology of a circuit board divided into two identical functional units.

FIG. 1 illustrates the topological arrangement of a generic circuit board, such as a processing board 1 in which the two functional logic units 10 are indicated. The board is ideally divisible along its longitudinal axis and has a mirrored structure, with the two functional logic units identical to each other to form a double circuit path on the single board and that each have means for direct communication with the communication bus 2. The two functional logic units 10 execute the same functions in a plurality of different ways giving the system a real and native operating logic redundancy that reduces the risk of out of use events of a subsystem due to a hardware fault.

The project philosophy is based on complete doubling of the control logic unit also at peripheral level so as to increase the availability of the system for the assessment and detection of faults in the programmable electronic devices, used in field of safety.

The system utilizes a programmable dual logic hardware of FPGA type that allows redundancy to be created and fully exploited according to a configurable diagram. The main functionalities and the management of redundancy are obtained using hardware synthesis tools through VHDL language (VHSIC Hardware Description Language). The essential blocks for operation are thus synthesized in hardware and their functionalities are independent from any software execution flows and completely predictable and testable.

Robust advanced self-diagnosis and fault tolerance functionalities are obtained by implementing in each board a control system that operates distinctly on the doubled logic units and allows the implementation of various degrees of interoperability, according to a non-blocking electronic diagram. In fact, the functional logic units of each circuit board share the inputs and the outputs of the board in non-blocking mode, i.e., malfunctioning of one of the two units, does not block or compromise operation of the other. All the parts control one another in a non-blocking manner.

In order to obtain non-blocking mode, it is possible to provide different circuit configurations.

According to a first configuration, logic ports, for example XOR gates, can be provided between all the input and output devices, which make it possible to establish whether the actions of one functional logic unit must take over from those of the other.

Alternatively, it is possible to provide different circuit configurations comprising diodes and resistors organized so as to perform the same function as the XOR logic gate.

This function must allow reading of the lines to be monitored or controlled, input and output, that allows self-diagnostics to be implemented.

In this way, if a line is blocked by one of the two functional units, the other functional unit, analysing the status of the line, can notice the block and can "take control of the line", in any case being able to operate on the device to be controlled, or inverting the control logic unit from the XOR output, or yet again forcing more or less control current in the case in which a diode operates on different resistive weights.

This expedient ensures that the logic units can overlap one another in operation and thus operate according to multiple levels of redundancy, such as simple control, one unit taking over with respect to the other if the latter stops working, alternate operation or utilize more advanced arbitration techniques having more than three logic units.

By exploiting particular configurations, it is possible to implement decisional arbitration and voting functionalities. For example, by providing the control unit with two processing boards 1, four processing functional logic units 10 are obtained. Of these four units, three can operate in parallel or take over from one another, while the fourth can act as supervisor for the other three.

Each board of the system also has a dual power supply section, a dual control logic unit and two physically distinct electrical paths for the inputs and outputs.

This architecture allows minimization of the possibility of dangerous undetectable faults that could lead to a loss of functionality and safety of the system.

Figure 2:
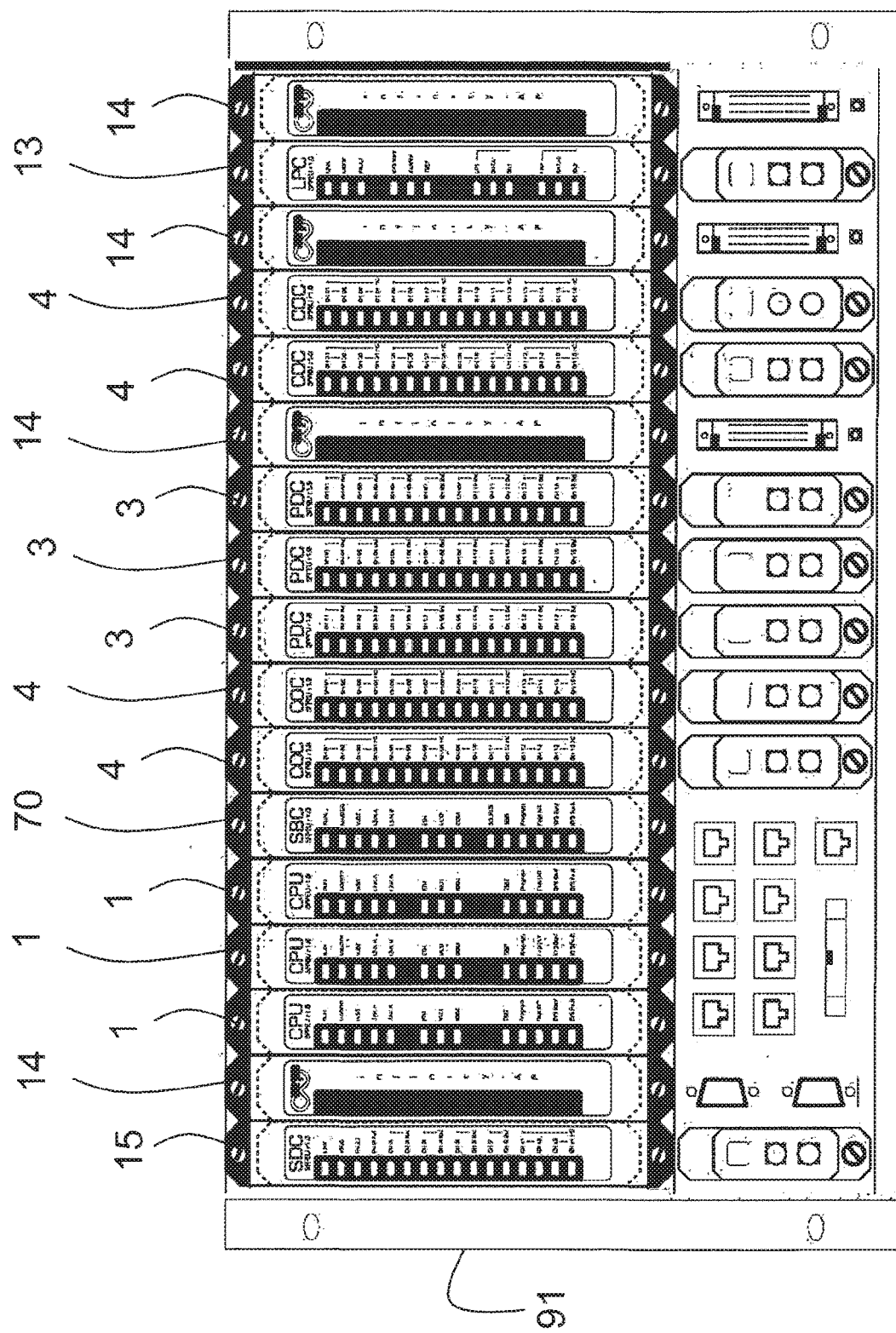
FIG. 2 illustrates a support frame that provides housing and connections for the circuit boards.

FIG. 2 illustrates the circuit boards of the control unit mounted on a support frame 91, or central rack, which is provided with specific seats or slots for housing the boards. Each board has a screen printed front panel of specific colour to indicate the type of board and with warning lights corresponding to the various operating modes of the single circuit board. Information on the status of the electronic subsystems can be useful for an operator or maintenance engineer to diagnose any faults or check their correct operation.

The support frame 91 comprises a structure that defines six housing units. The structure is preferably made of anodized aluminum in accordance with fire-prevention regulations.

The frame substantially comprises two sections. The upper section, which comprises four units, is designed so as to accommodate the boards of the system through guides for insertion and removal and metric connectors HM2.0 utilized in the field of telecommunications. The lower section, which comprises two units (public area), is designed to accommodate all the electrical connections to other devices and the connections to the field 5 through DIN41612 connectors.

The frame exploits a positional geometry dedicated to the different system boards and is preferably set up as described below. Preferably, the slots are provided with hardware keys to prevent erroneous insertion of the various boards.

With particular reference to FIG. 2, from the left:
the first position (or slot) is dedicated to the default board 14, which provides a minimum set of inputs/outputs in accordance with the fire-prevention regulations and the control functionality of the power supply sources;

the second position accommodates an empty plastic module 15 due to the absence of connectors, i.e. a filling panel utilized when no circuit board is utilized in the specific slot;

from the third to the fifth position only processing boards or CPUs 1 can be accommodated;

the sixth position is reserved for a control unit interconnection board 70 for transmission and reception;

the remaining positions numbered from 01 to 11 can accommodate the input boards 3 and the output boards 4 or a loop board 13.

As will be explained below, the control unit inter-connection board 70 provides connectivity between different control units and a system for managing the computational resources between the various interconnected control units.

The loop board 13, is instead a board designed to operate with fire-prevention devices connected on a loop digital bus according to different protocols.

The lower section of the support frame 91 represents the public area and is designed to offer the connectivity typically required by systems dedicated to safety.

All the boards are accommodated in a plastic container with antistatic and fire-retardant characteristics. These modules are provided with two screws for blocking them in position on the frame and two release devices that allow them to be safe and effortless removal.

FIG. 3 illustrates a diagram of the fire-prevention system.

The control unit consists of a logic block 7 and an IOC block 6, which communicate with each other through the communication bus 2.

It is specified that the diagram illustrated in FIG. 3, is a block diagram and represents a minimum configuration of the control unit of the present invention.

In fact, FIG. 3 illustrates the concept of producing functional subsystems that interact with one another: it will thus be possible to provide a control unit with more than one logic block 7 and/or IOC block 6.

The IOC block 6, which comprises the input boards 3 and the output boards 4, communicates with the field 5. The logic block comprises one or more processing boards 1 and can optionally comprise a control unit inter-connection board 70 for transmission/reception.

The processing board 1 implements the main functionalities of the whole safety system. At least one processing board 1 is essential for operation of the system. Additional processing boards allow different degrees of redundancy to be obtained so as to satisfy the specific requirements of the level of safety established for the particular system. In normal operations, the processing board 1 acquires the inputs from the input boards 3 responsible for detection, implements the safety function and then produces all the outputs towards the output boards 4 responsible for reporting, intervention and/or extinguishing a fire. In the example of embodiment of the figures, up to three processing boards 1 are provided. The system also provides a software tool utilized to produce the specific safety function for the system, in which a configuration file of is exported and loaded into the processing board 1 through a serial communication.

The control unit inter-connection board 70 for transmission/reception has the task of virtualizing the computational resources. For example, if in a control unit all the processing boards 1 are deactivated, the control unit inter-connection board 70 for transmission/reception identifies the computational resource in a remote processing board 7', for example on another physically distinct and optionally remote control unit, and shares it with the input and output boards that require computational capacities.

The control unit inter-connection board 70 for transmission/reception thus allows a virtualization of the resources and, in accordance with the configuration illustrated in FIG. 3, the control unit inter-connection board 70 for transmission/reception belongs to the logic block 7, but forms an independent subsystem, also having its own logic and communication means 75' to the communication bus 2.

The union of the control unit inter-connection board 70 and of the logic block 7, thus allows the production of a functional subsystem, i.e., of a local computational cluster, capable of remotely processing the data detected by the field boards.

The remote processing board 7' is a specialized CPU board that allows "mirroring" and "shadowing" operations of the logic resources of the whole system.

On the basis of this configuration, any bus linked to the remote CPU 7' can in fact be conveyed, all or in part, on the control unit inter-connection.

This, combined with the native redundancy of the system, allows high levels of safety integration to be obtained.

The communication bus 2 is based on the architecture of an HDLC link (High-Level Data Link Control), with a specific interrupt management for the typical requirements of a fire-prevention system and integrating a specific block for mapping and diagnostics of the physical links of the system. The communication bus 2 operates in multimaster mode and, therefore, overcomes the limits of known systems in which the obligatory passage of all the data in a controller, or concentrator, makes this node particularly critical. The communication bus 2 is not completely synchronous and is provided with a specific communication protocol manager. This protocol integrates operating modes oriented towards connection and allows the coexistence of types of communication, even differing from one another, on the basis of a priority management. In this way, it is possible to allocate one more or fewer transport resources on the communication bus 2 as a function of the type of communication to be implemented. Besides this, it is possible to manage additional services, such as broadcast messages, operating diagnostics, automatic link control and dynamic mapping of the time slots (communication frame). This latter allows management of pseudo-asynchronous communications, i.e. those that do not respect timing. The operating diagnostic service allows evaluation on the quality of a service to be carried out.

The communication bus 2 comprises two communication channels and, therefore, contributes to the redundancy of the system. As the communication bus 2 is dual, it is possible to divert a communication onto one channel or onto the other, so as to make full use of the resources.

A user interface block 8 is also connected to the communication bus 2. Said user interface 8 manages all the reporting, notification, control and interface functions toward an operator. The user interface block 8 comprises a panel 80, described below in relation to FIG. 7, and a data collection and processing board for the interface 82.

The logic block 7, the IOC block 6 and the user interface 8 communicate with the bus 2 through means for direct communication with the bus, 75, 65 and 85 respectively.

In this way, the data collection and processing board for the interface 82 does not dialog directly with the processing board 1, but, on the contrary, collects and processes the information present on the bus 2.

The data collection and processing board 82 thus operates on the same data available to the CPU of the logic block 7, but without directly involving the same CPU.

The system is provided with a power supply module comprising a line commutated power supply and a battery charger provided for a secondary source consisting of auxiliary batteries.

Figure 4:
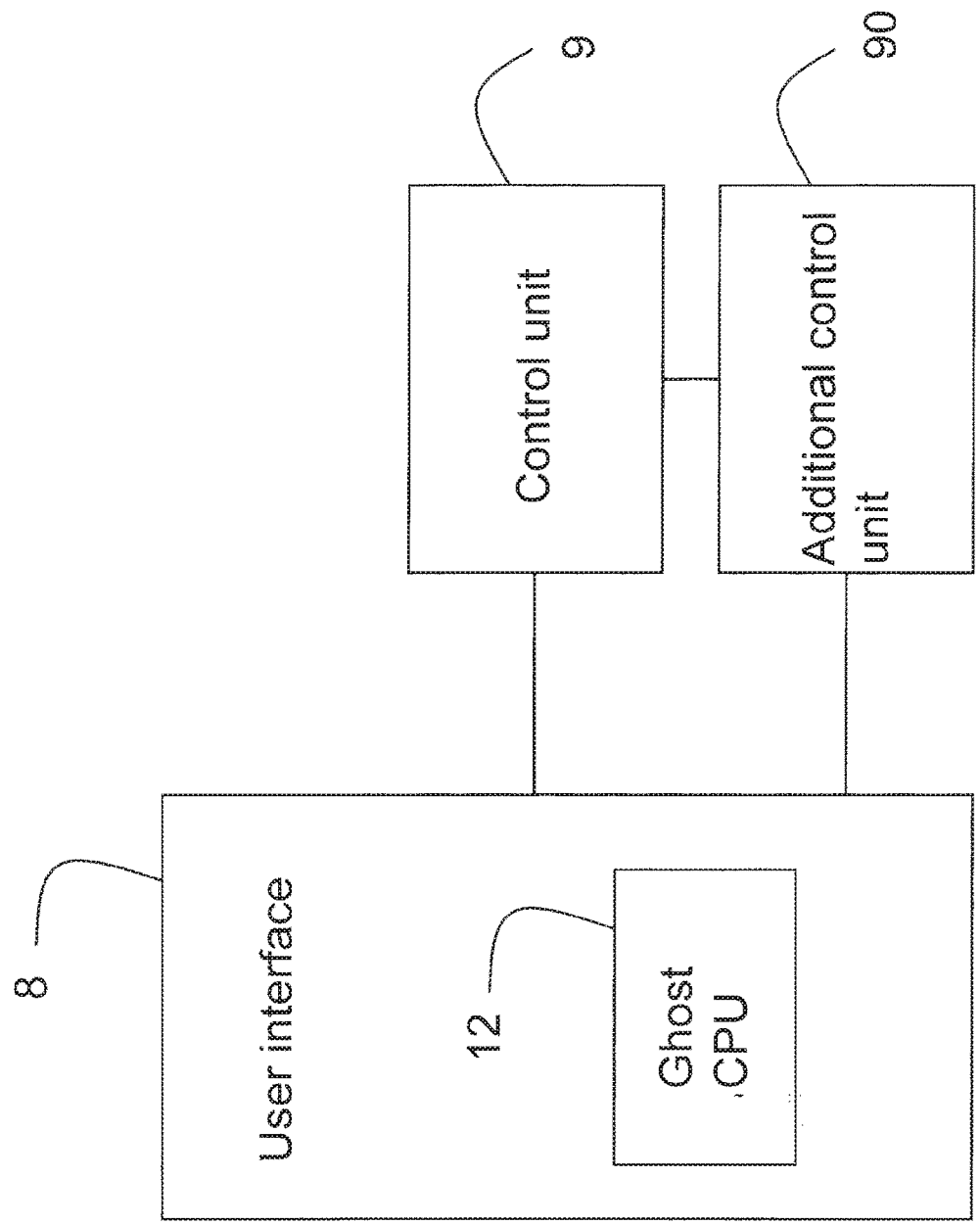
FIG. 4 illustrates a possible configuration of the fire-prevention system.

FIG. 4 illustrates a possible embodiment of the system, in which the control unit 9 is backed up by an additional control unit 90. Preferably, the system can accommodate further additional support frames, for example up to seven, to extend the functionality and the number of boards installable.

As described previously for the data collection and processing board 82 in FIG. 3, according to an aspect of the invention, it is possible to provide an additional logic functionality called ghost CPU 12. The ghost CPU 12 allows the commands to be operated remotely and, therefore, allows the system to be freed from this component. In fact, the ghost CPU 12 does not interrogate the processing board 1 of the control unit, but, on the contrary, collects and processes the data from the communication bus 2 directly.

Figure 5:
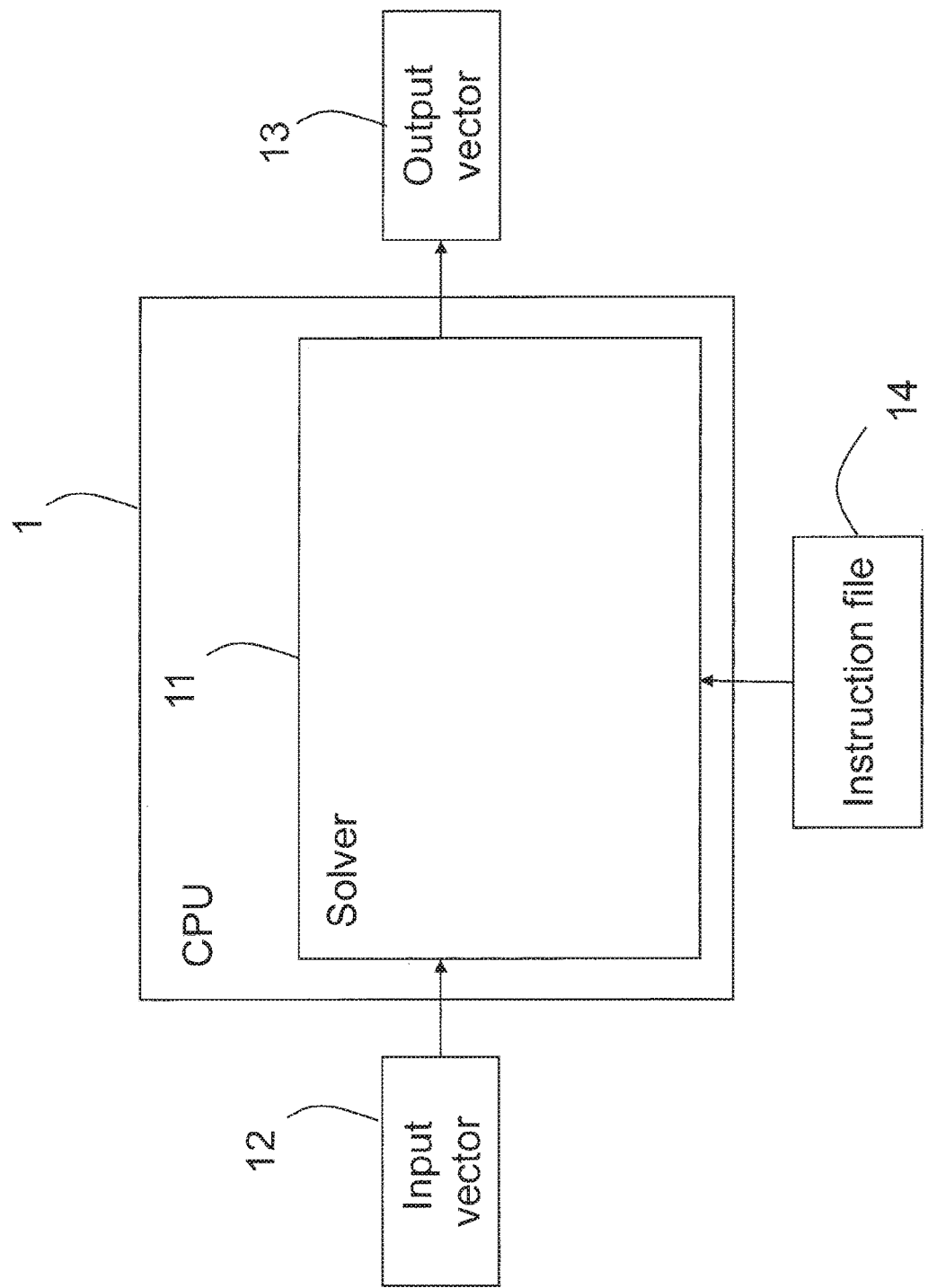
FIG. 5 illustrates a diagram of the logic solver.

FIG. 5 illustrates Logic Solver unit 11 of the control unit, which consists of an independent logic unit which is part of the processing board 1. In practice, this is a hardware block written in VHDL language which allows the implementation of a computational logic residing in the processing boards 1, particularly efficient in the field of functional safety.

The internal architecture implemented allows rapid reaction to system events (controlled by events) dictated by fire-prevention regulations, so as to minimize the logic paths required.

More precisely, the aforesaid solver unit 11 is a programmable hardware processor that, with a minimum set of instructions, performs computational logics critical in the field of safety, allowing the implementation of logics that can also be personalized by a user, as well as the dedicated functional logic blocks responding to fire-prevention regulations. The computational performance is very high and is obtained by releasing the setup files from those containing the instructions. Operation is based on the method of resource addressing, through a system of "mirroring" and virtualization of the address space, including the computational-logic ones. This approach, combined with the system bus, allows the implementation of ESC dynamic functional clusters through real time reorganization of the resources, also between several interconnected control units, promoting the "availability" of the system and ensuring its operation even in the case of possible faults.

In addition to this structure, a diagnostic, supervision and arbitration functionality is also provided, controlled by a mapping unit called device mapper. The device mapper allows advanced arbitration and control functionalities on the computational paths to be provided. The logic behaviour of the system can be reprogrammed to meet different regulations and standards in the field of fire-prevention. The solver unit 11 operates on an input vector 12 and an output vector 13. The data processed by the solver unit 11 are supplied to the output vector 13 that, through the device mapper, is wired directly to the output board 4. The addressing space of these vectors can be virtualized so as to be correlated to physical devices on the control unit or to devices controlled by external units such as in the case of inter-connected units or units for importing/exporting variables from and to other systems. The solver unit 11 can be programmed by means of an instruction file 14.

From the description above it can thus be understood that the architecture of the processing board 1, or CPU, also comprises a dynamic mapping operator of the devices connected and configured and a comparative diagnostic mechanism. Therefore, the processing board 1 implements different data communication standards so as to import and export any information and rules from or to the additional external electronic systems.

The CPU board 1 also has a non-volatile memory in which a configuration file with the parameters related to the settings for the specific installation resides.

In the case of several CPU boards installed, this file is cross-correlated between the different subsystems so as to eliminate any problem of integrity of the data.

At hardware level, the diagnostic system supervises normal operation, analysing each operating parameter from the power supply voltages to the temperature of the printed circuit and, after having evaluated the configuration, decides what the operating status of the two logics should be.

Figure 6:
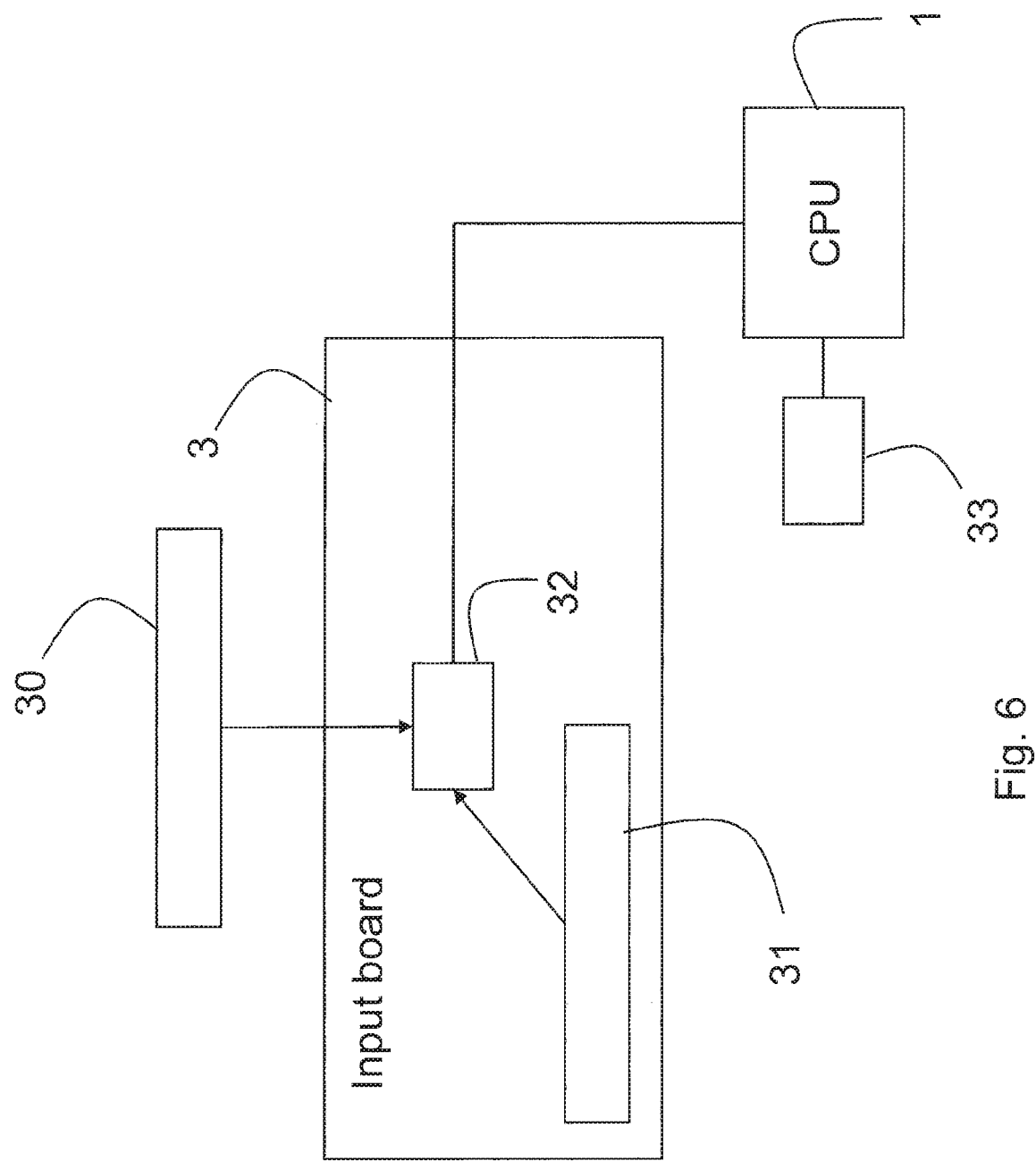
FIG. 6 illustrates a diagnostic functionality of each circuit board.

FIG. 6 illustrates a diagram of the diagnostic functionality of each board. In fact, each circuit board has an independent operating logic, also with an independent part of diagnostics. Inside the board, an input board 3 in the figure, a control vector 32 on which a redundancy value is calculated is generated. In turn, this redundancy value is obtained by a configuration vector 31 and by an input vector 30 (or optionally output vector, according to whether it is an input or an output board, respectively). Preferably, calculation of the redundancy value uses the CRC32 algorithm. Said redundancy value is available at a processing board 1, which compares it with an expected value contained in a reference vector 33. In this way, in the case in which a computation resource is absent, for example due to physical disconnection of one of the circuit boards, when it becomes available again it is not necessary to reinitialize this board.

In particular, each input board consists of a circuit board, dedicated to the acquisition of digital or analog input devices and/or circuits, which uses a dual loop for current reading and Class II insulation.

The configuration of the board provides for different operating modes according to the device or to the detection circuit to be used. In fact, line control, automatic reset, direct reading, selective status storage, 2/4 wire interface with separate power supply and differential current control to facilitate any ground leakages are possible.

This board can universally acquire analog voltage or current levels or configurable on discrimination intervals, also for overlappable thresholds, facilitating the creation of safety logics.

The aforesaid architecture makes it universal, allowing it to adapt to a plurality of circuit configurations.

The channels of the board are monitored and calibrated at time intervals. In the case in which an internal fault to the circuits of the board occurs, the channel is made to operate through a single current loop and the fault is reported promptly for replacement. In the case in which the redundant part of the channel is also unable to operate correctly and the detection circuit has no further boards in parallel on the given device, it is put out of use and must be replaced as soon as possible.

Instead, with regard to the output boards, a circuit board is advantageously provided, designated with controlling analog or digital output devices even with noteworthy energy absorption.

Just as for all the modules of the system of the present invention, the board is based on an architecture with dual logic in non-blocking configuration. The part dedicated to the field devices utilizes power H bridges and a dual system for reading the current to the load.

The board offers up to 16 single channels configurable and joinable so as to reach control capacities of up to 2.5 A (maximum 4 HC channels) continuous on the load. The different configurations of the channels provide for normal or inverse control of the line, control of the current and of the energy on the load, proportional activation of the load by means of PWM and selective status storage.

Just as for the other boards, a monitoring and calibration system of the channels performs the diagnostics and in the case of an internal fault switches operation onto the redundant part. Also for this board it is possible to join different channels also of different boards on a single circuit or activation device so as to use redundancy of a degree greater than 2.

Figure 7:
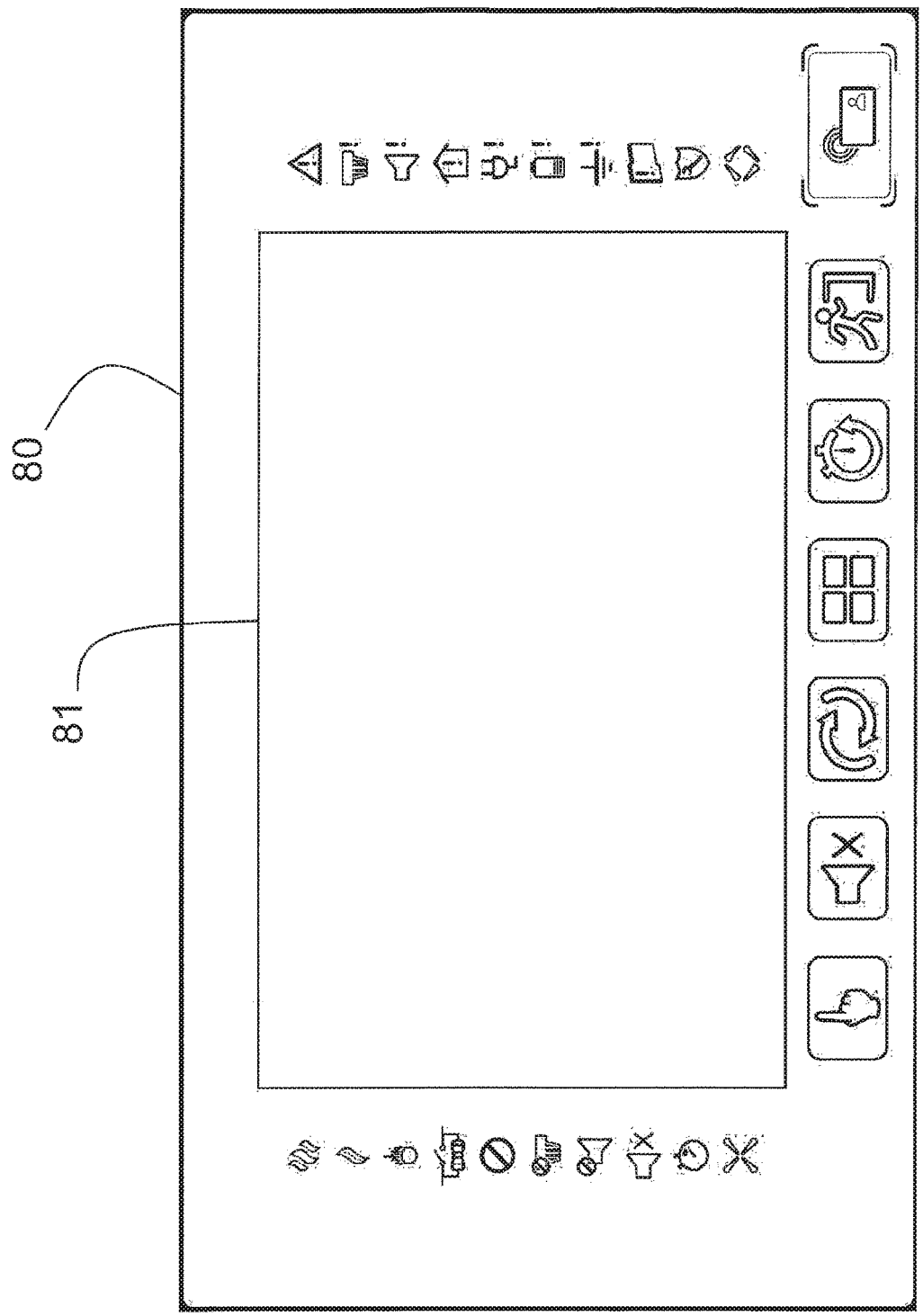
FIG. 7 illustrates a possible example of embodiment of the user interface panel.

FIG. 7 illustrates an embodiment of the interface panel 80. The panel 80 is provided with touch function keys, as in the example illustrated, high contrast LEDs for reporting the system statuses, twenty in the example illustrated, and a display 81, preferably a touch screen, for advanced management of the various configurations, of the system maps, of the operations and of the event history of the system.

According to a preferred aspect of the invention, operator access to the control unit is managed with different access levels corresponding to given settings. Identification of a user, and therefore of the related access level allocated, is implemented via password or, preferably, a magnetic card provided with a transponder of RFID type.

The invention has been described purely for illustrative and non-limiting purposes, according to some preferred embodiments. Those skilled in the art may find numerous other embodiments and variants, all falling within the scope of protection of the claims below.

The invention claimed is:

1. A fire-prevention control unit comprising:
a plurality of circuit boards; and
a dedicated communication bus for communication between said circuit boards, said circuit boards comprising
at least one processing board,
at least one input board,
at least one output board, said at least one processing board being configured to process input data received from said at least one input board and to generate commands to send to said at least one output board, said at least one input board and said at least one output board being configured to communicate with one or more devices to be monitored or controlled,
wherein each circuit board comprises
two substantially identical and physically distinct functional logic units configured to perform the same function, each of the functional logic units comprising a communication system configured for direct communication with the communication bus, and
at least one logic gate configured so that each of the functional logic units operates in a non-blocking, diagnostic mode with respect to the other functional logic units.

2. The fire-prevention control unit according to claim 1, wherein said communication bus comprises at least two communication channels, each of the communication channels being configured to enable communication between said circuit boards.

3. The fire-prevention control unit according to claim 1, wherein the communication bus is configured to prioritize data communicated by the boards.

4. The fire-prevention control unit according to claim 1, wherein each of the functional logic units comprises a programmable integrated circuit of the Field Programmable Gate Array (FPGA) type.

5. The fire-prevention control unit according to claim 1, further comprising at least one user interface unit connected directly to said communication bus.

6. The fire-prevention control unit according to claim 1, wherein said at least one input board and said at least one output board comprise at least one processor configured to generate a control code calculated based on an input or output vector and a board configuration vector, said control code being accessible at least from said processing board to perform a consistency comparison test with a corresponding expected control code.

7. The fire-prevention control unit according to claim 1, wherein the circuit boards comprise a control unit interconnection board, enabling communication by the at least one input board or the at least one output board, with a processor or a remote computational device.

8. The fire-prevention control unit according to claim 2, wherein the communication bus is configured to prioritize the data communicated by the boards.

9. The fire-prevention control unit according to claim 2, further comprising at least one user interface unit connected directly to said communication bus.

10. The fire-prevention control unit according to claim 2, wherein said at least one input board and said at least one output board comprise at least one processor configured to generate a control code calculated based on an input or output vector and a board configuration vector, said control code being accessible at least from said processing board to perform a consistency comparison test with a corresponding expected control code.

11. A fire-prevention control unit comprising:
a plurality of circuit boards; and
a dedicated communication bus for communication between said circuit boards, said circuit boards comprising
at least one processing board,
at least one input board, and
at least one output board, said at least one processing board being configured to process input data received from said at least one input board and to generate commands to send to said at least one output board, said at least one input board and said at least one output board being configured to communicate with one or more devices to be monitored or controlled,
wherein each circuit board comprises
two substantially identical and physically distinct functional logic units configured to perform the same function, each of the functional logic units comprising a communication system configured for direct communication with the communication bus, and
wherein said at least one input board and said at least one output board comprise at least one control code processor configured to generate a control code calculated based on an input or output vector and a board configuration vector, said control code being accessible at least from said processing board to perform a consistency comparison test with a corresponding expected control code.

12. The fire-prevention control unit according to claim 11, wherein said communication bus comprises at least two communication channels, each of the communication channels being configured to enable communication between said circuit boards.

13. The fire-prevention control unit according to claim 11, wherein the communication bus is configured to prioritize data communicated by the boards.

14. The fire-prevention control unit according to claim 11, wherein the circuit boards comprise a control unit interconnection board, enabling communication by the at least one input board or the at least one output board, with a processor or a remote computational device.

15. A fire-prevention control unit comprising:
a plurality of circuit boards; and
a dedicated communication bus for communication between said circuit boards, said circuit boards comprising
at least one processing board,
at least one input board, and
at least one output board, said at least one processing board being configured to process input data received from said at least one input board and to generate commands to send to said at least one output board, said at least one input board and said at least one output board being configured to communicate with one or more devices to be monitored or controlled,
wherein each circuit board comprises two substantially identical and physically distinct functional logic units configured to perform the same function, each of the functional logic units comprising a communication system configured for direct communication with the communication bus, and
wherein the circuit boards comprise a control unit interconnection board, enabling communication by the at least one input board or the at least one output board, with a processor or a remote computational device.

16. The fire-prevention control unit according to claim 15, wherein said communication bus comprises at least two communication channels, each of the communication channels being configured to enable communication between said circuit boards.

17. The fire-prevention control unit according to claim 15, wherein the communication bus is configured to prioritize data communicated by the boards.

18. A fire-prevention system comprising:
at least one fire-prevention control unit according to claim 1; and
at least one user interface comprising
at least one processor configured to manage communication by said user interface with the communication bus, and
at least one display independent from the functional logic units.

19. A fire-prevention system comprising:
at least one fire-prevention control unit according to claim 11; and
at least one user interface comprising
at least one user interface processor configured to manage communication by said user interface with the communication bus, and
at least one display independent from the functional logic units.

20. A fire-prevention system comprising:
at least one fire-prevention control unit according to claim 15; and
at least one user interface comprising
at least one user interface processor configured to manage communication by said user interface with the communication bus, and
at least one display independent from the functional logic units.

* * * * *